US012672993B2

(12) United States Patent
Le et al.

(10) Patent No.: US 12,672,993 B2
(45) Date of Patent: Jul. 7, 2026

(54) VARIABLE GEOMETRY THERAPEUTIC BED TURNING AND CENTRALISING AN IMMOBILE PATIENT FOR THE PREVENTION OF PRESSURE WOUNDS WITH ASSOCIATED METHOD

(71) Applicants: Hoang Van Le, Brossard (CA); Phu Tao Le, Ville St-Laurent (CA)

(72) Inventors: Hoang Van Le, Brossard (CA); Phu Tao Le, Ville St-Laurent (CA)

( * ) Notice: Subject to any disclaimer, the term of this patent is extended or adjusted under 35 U.S.C. 154(b) by 0 days.

(21) Appl. No.: 18/245,438

(22) PCT Filed: Sep. 15, 2021

(86) PCT No.: PCT/CA2021/051292

§ 371 (c)(1),
(2) Date: Mar. 15, 2023

(87) PCT Pub. No.: WO2022/056634

PCT Pub. Date: Mar. 24, 2022

(65) Prior Publication Data

US 2023/0355452 A1 Nov. 9, 2023

(30) Foreign Application Priority Data

Sep. 15, 2020 (CA) ................................ CA 3093143

(51) Int. Cl.
*A61G 7/00* (2006.01)
*A61G 7/057* (2006.01)

(52) U.S. Cl.
CPC ........... *A61G 7/001* (2013.01); *A61G 7/0573* (2013.01); *A61G 2203/30* (2013.01)

(58) Field of Classification Search
CPC ................................ A61G 7/001; A61G 7/015
See application file for complete search history.

(56) References Cited

U.S. PATENT DOCUMENTS

| | | | |
|---|---|---|---|
| 5,394,577 | A | 3/1995 | James et al. |
| 7,464,422 | B2 | 12/2008 | Townsend |

(Continued)

FOREIGN PATENT DOCUMENTS

| | | | |
|---|---|---|---|
| CA | 2997972 | A1 | 7/2018 |
| CN | 104013505 | A | 9/2014 |

(Continued)

OTHER PUBLICATIONS

Preliminary Examination Report dated Sep. 16, 2025 issued in the corresponding Brazilian Patent Application No. BR112023004714-5.

*Primary Examiner* — Adam C Ortiz
(74) *Attorney, Agent, or Firm* — Brouillette Legal inc.; Philippe Brouillette

(57) ABSTRACT

Device and method for turning a bedridden and immobile patient from left to right and vice-versa. It lessens the risk pressure wounds (bed wound, pressure sore). The device comprises a support surface having a variable geometry to create concave surfaces along the bed. The lowermost zone is formed to the left or to the right of the spine of the patient. Under the effect of gravity, the patient is turned towards the lowermost zone, softly. Once turned, the device also allows the centralisation of the patient towards the middle of the frame. The device may also laterally extend to give more space to a turned patient. By combining the shape change with a timer system, corporal pressure zones of the patient are cyclically displaced. It allows the turning of the patient based on current standards of care.

5 Claims, 8 Drawing Sheets

(56) References Cited

U.S. PATENT DOCUMENTS

| | | | | |
|---|---|---|---|---|
| 2004/0064891 | A1 | 4/2004 | Horitani | |
| 2004/0103475 | A1 | 6/2004 | Ogawa et al. | |
| 2005/0160530 | A1 * | 7/2005 | Taguchi ................. | A61G 7/001<br>5/613 |
| 2005/0166323 | A1 | 8/2005 | Kawakami et al. | |
| 2011/0138535 | A1 | 6/2011 | Rowes et al. | |
| 2012/0186587 | A1 | 7/2012 | Steffens et al. | |
| 2014/0304915 | A1 | 10/2014 | Lachenbruch | |
| 2020/0297124 | A1 * | 9/2020 | Schell .................... | A61G 7/018 |

FOREIGN PATENT DOCUMENTS

| | | | |
|---|---|---|---|
| CN | 211323613 | U | 8/2020 |
| EP | 1486191 | A1 | 12/2004 |
| KR | 20110078599 | A | 7/2011 |
| WO | 2006085755 | A2 | 8/2006 |
| WO | 2019081954 | A1 | 5/2019 |

* cited by examiner

VARIABLE GEOMETRY THERAPEUTIC BED TURNING AND CENTRALISING AN IMMOBILE PATIENT FOR THE PREVENTION OF PRESSURE WOUNDS WITH ASSOCIATED METHOD

CROSS-REFERENCE TO RELATED APPLICATIONS

The present patent application claims the benefits of priority of commonly assigned Canadian Patent Application no. 3,093,143, entitled "LIT THERAPEUTIQUE A GEOMETRIE VARIABLE TOURNANT ET CENTRALISANT UN PATIENT IMMOBILE POUR PRÉVENIR LA PLAIE DE LIT AINSI QUE MÉTHODE ASSOCIÉE" and filed at the Canadian Intellectual Property Office on Sep. 15, 2020.

FIELD OF THE INVENTION

The present invention generally relates to a process and a device to rotate (turn or change position) and center an immobile bedridden person progressively or periodically. The present invention relates to the field of medical beds, more precisely, to beds for turning or changing the position of an immobile person.

BACKGROUND OF THE INVENTION

Pressure wound is a skin and underlying tissues lesion due to pressure only, combined with friction or shear stress. The reduced mobility of a bedridden patient who shall stay in a bed or a chair for long periods of time augments the risks to develop pressure wounds. Other aggravating factors may also be combined with the effect from pressure, such as: insufficient nutritional diet, dehydration, diminished skin sensitivity, consciousness variation and/or various other health related problems such as diabetes, venous insufficiency, peripheral neuropathy, etc. The body locations most susceptible to the creation of pressure wounds are the occiput, the ears, the shoulders, the back, the elbows, the sacrum, the coccyx, the buttocks, the hip, the knees, the heels and the toes.

The recommendations for preventing pressure wounds are as follows:

Avoid or reduce the pressure applied to critical regions prone to pressure wounds with pillows without displacing the patient; and Displace the applied pressure on another location on the body, the applied pressure restraining the circulation of blood and the applied pressure created by the weight of the patient on the surfaces of the bed in contact with the skin of the patient. In order to do so, the bedridden patient is generally moved at a frequency of about 2 hours or less.

In practice, there are a plurality of difficulties associated with applying these recommendations. Avoiding and reducing pressure wounds of a bedridden patient are generally done by dividing the weight of the patient in a larger body surface with a support mattress and pillows. It does not mean that bedridden patients may stay in said positions indefinitely. The best solution is generally to change the pressure zones at each 2 hours or less. Nonetheless, in reality, it is quite difficult for patient attendants to respect this positioning schedule due to their loaded workload. Turning a bedridden and immobile patient requires the presence of at least two people, with up to three or more for large patients.

There also exists mattresses for the prevention of wounds or sores and preventive mattress toppers. Their pressure wound reducing efficiency is variable based on the model and the technology used for each, and said mattresses or mattress toppers may not change or barely change the positioning of a patient.

An analysis of the task of turning a patient-by-patient attendants was performed. Firstly, there is a passive translation movement of the patient to a side of the bed. This movement allows said patient to be kept centered in the bed when turned. Secondly, there is a passive rotation movement of the patient around its rostro-caudal axis. This movement allows avoiding pressure wounds. There is thus a need for a device which may perform these two tasks without requiring as many attendants or at least not as much physical effort from said attendants. Finally, an attendant supervising the process must position the arms and legs of the patient to complete the task.

The following documents present patents proposing solutions for preventing pressure wounds. Canadian patent CA 2997972 teaches oscillating a rigid surface, straight or curved, in the longitudinal and transversal axis in order to prevent the creation of pressure wounds. In the transversal axis, if the oscillation angle is too big, the patient may roll on its side in an exaggerated manner and even possibly fall from the bed. If the oscillation angle is medium or small, the pressure applied on critical points of the patient's body may not vary enough and thus stay above the capillary pressure of 3333.06 Pascal. It is to be noted that, if the capillary pressure is higher than 3333.06 Pascal, the risk of having a pressure wound is present. In the longitudinal axis, the inclination may translate to shear pressure on the skin of the patient, which is not recommended. Furthermore, the rostro-caudal oscillation may provoke discomfort, dizziness or even nausea to the patient.

The patient's contact with the surface of the bed does not change with the oscillating movements from the device. These oscillations thus only perform a partial variation of the pressure locations on the body of the patient.

Next, the American patent application US 2014/0304915 A1 teaches a method to determine the parameter "temporal-tolerance" to pressure wounds. This method establishes a relation between the pressure applied to the skin of a patient and the tolerable exposition time. By a system of pressure sensors, a system controlling data specific to each of a plurality of patients may determine the interval duration for changing the position of each patient.

According to healthcare norms to avoid pressure wounds, no part of the body must be applied a pressure blocking local blood circulation for more than two hours. Calculations for the "temporal-tolerance" are thus more complicated due to those norms.

The device of the American patent application comprises multiple sections in the longitudinal direction of the bed. It may allow the raising of the head, the legs and the feet of the patient. The primary inflatable elements of the device are configured to be lined the width of the bed. The lateral inflatable elements permits the elevation of one side of the patient at a time. The pressure variation in the inflatable elements allows the control of the pressure applied on the patient. Nonetheless, this device does not allow a complete rotation of a patient on its sides. This means that some portions of skin may be in contact with the bed for more than two hours.

Next, the European patent application no. EP 1,486, 191 A1 is teaching increasing a bedridden patient's comfort on inclinable beds by adding a hips and knees flexion device which is configured to work during the inclination of said patient.

In the transversal direction of the bed, the flexion device comprises a central section and two lateral sections. The central section is at least as large as the patient. The two lateral panels may turn 90 degrees and may thus form vertical surfaces to prevent the patient from falling off the bed. The combination of a central and lateral panels results in a bed larger than beds usually found in hospitals and care centers. Furthermore, the physical restrictions caused by the lateral panels on the patient may cause anxiety and claustrophobia. With this bed, the patient remains on the central surface which rotates until said patient slides on the lower lateral panel. The rotation axis of this bed is non median, which means that it is not in line with the longitudinal axis of the head and vertebral column of the patient. Instead, the bed comprises two rotation axes passing through folding lines between the central panel and the lateral panels. More so, the central panel is especially large to receive a larger patient and may thus not be appropriate for a thinner patient. Accordingly, a thinner or smaller patient may have a tendency to slide more abruptly compared to a larger patient before being stopped by the lower lateral panel before being raised by an axis of rotation completely out of the width of his body.

Finally, the American patent application no. US 2005/0166323 A1 is an improvement of the previously presented European patent application no. EP 1,486,191 A1. This patent application teaches the correction of a problem related to the directional change of the load applied to motors when changing the side of the applied center of mass around support points, one being on the left and one being on the right based on the inclination side of the central section. This abrupt change results in a sudden jerk motion of the central support section and in an unwanted change of the inclination speed of the patient. This sudden abrupt change may disturb the bedridden person. The solution proposed is the addition of a device pre-applying a charge to the jacks of the motors so that they may always be in compression or in tension during the inclination operations of the central section. This solution relates to the geometry of the chosen mechanism.

OBJECTS OF THE INVENTION

One of the objectives of the invention aims at eliminating the forming of pressure wounds of the skin and underlying tissues. The device naturally turns the patient with an opened surface, without physical restrictions. Accordingly, the device generally aims at reducing the pain at pressure points, to reduce the risk of wounds of the bedridden and to augment the comfort of the patient. The invention also aims at diminishing the physical efforts of the caretakers for operations requiring that a patient be turned in his/her bed and be centralised in the middle of the frame.

SUMMARY OF THE INVENTION

The aforesaid and other objectives of the present invention are realized by generally providing a support surface which may change its geometry in order to turn and centralize a bedridden patient based at least on the above-described healthcare norms.

In a first embodiment, a variable geometry device for turning and centralizing a patient is provided, the device comprising: a frame; a variable geometry surface attached to the frame; a movement control system varying shape of the variable geometry surface; a position detection system for detecting the position and amplitude of movements of the variable geometry surface; and an electric power source feeding the movement control system and of the position detection system.

In an aspect of the invention, the variable geometry surface comprises at least three transversal panels, the panels moving jointly to vary the shape of the variable geometry surface into a concave surface, the patient being turned by gravity on the concave surface.

In an aspect of the invention, the three transversal panels comprise a movable central panel, the central panel moving along a predetermined trajectory.

In an aspect of the invention, the predetermined trajectory comprises a rotation movement around a rotation center and a translation movement to turn and center the patient.

In an aspect of the invention, the variable geometry surface is positionable at a stable equilibrium position. The equilibrium position may correspond to a horizontal position. A mass center of the central panel may be under the rotation center at the equilibrium position.

In an aspect of the invention, the rotation center may be horizontally aligned with or under the central panel, the rotation axis of the central panel coinciding with the center of rotation of the central panel.

In an aspect of the invention, the rotation center of the central panel is over the central panel to create a translation movement.

In an aspect of the invention, the distance between a median line of the central panel and the centre of a lowermost zone of the variable geometry surface is adjustable depending folding lines.

In yet another aspect of the invention, the three transversal panels have a length of a standard bed.

In an aspect of the invention, the variable geometry surface further comprises a plurality of longitudinal panels, wherein movement of the longitudinal panels raises the legs and the back of the patient.

In an aspect of the invention, the three transversal panels are linked to one another with linking members to create lowermost zones. The linking members may be any one of the followings: articulated members, flexible members and independent movable surfaces.

In an aspect of the invention, the change of shape of the variable geometry surface increases or reduces a lateral surface of the variable geometry surface. The increasing of the lateral surface may provide a surface for the arms and the legs of the turned patient.

In an aspect of the invention, the device further comprises a mattress on the variable geometry surface. The mattress may have an adaptable length and width to adapt to the variation of shape of the variable geometry surface.

In an aspect of the invention, the movement control module is configured to modulate and sequence the variation of shape of the variable geometry surface.

Further provided may be a method for turning a patient, the method comprising: varying geometry of a support surface having an initial shape and adapted to receive the patient in an initial position; adjusting the geometry of the support surface to form a lowermost portion corresponding to a folding zone adapted to the anatomy of the patient; and turning the patient in the lowermost zone under the effect of gravity.

In an aspect of the invention, the method further comprises varying the geometry of the support surface so that the support surface regains the initial shape.

In an aspect of the invention, the method further comprises centralising the patient towards a median line of a frame supporting the supporting surface during the turning of the patient.

In an aspect of the invention, the method further comprises increasing the width of the support surface on the side that the patient is turned.

In an aspect of the invention, the method further comprises increasing the width of the mattress located on the support surface on the side that the patient is turned.

The features of the present invention which are believed to be novel are set forth with particularity in the appended claims.

BRIEF DESCRIPTION OF THE DRAWINGS

The above and other objects, features and advantages of the invention will become more readily apparent from the following description, reference being made to the accompanying drawings in which.

DETAILED DESCRIPTION OF THE PREFERRED EMBODIMENT

A novel support surface for rotating and centralizing a patient for preventing pressure wounds will be described hereinafter. Although the invention is described in terms of specific illustrative embodiment(s), it is to be understood that the embodiment(s) described herein are by way of example only and that the scope of the invention is not intended to be limited thereby.

A device and a method aimed at partially replacing the work of healthcare workers rotating (rolling) a bedridden patient from left to right and vice-versa on its sides and on its back in the most natural manner is presented. The act of moving a patient may be done automatically (intermittently or periodically) or may be directly controlled by a caretaker or the patient itself. Generally, the disclosed device and a method generally aim at allowing the rotation of a bedridden patient using gravity to roll said patient from one side to another with an opened support surface having a variable geometry, the form changes of the device controllable by an automatic or manual command system. With the capacity to laterally extend and to center a patient turned on the bed, the support surface may augment the comfort of said patient and may reduce the force required by caretakers.

The device comprises a variable geometry support surface.

FIGS. 1 to 7 illustrate a schematic representation of the functional principles and the characteristics of the support surface of the device. The explanations of these figures further describe the physics and the ergonomics of the device. Regarding the mechanical and structural aspects of the bed, they will be detailed in more details in the embodiments starting from FIG. 8.

Figure 1:
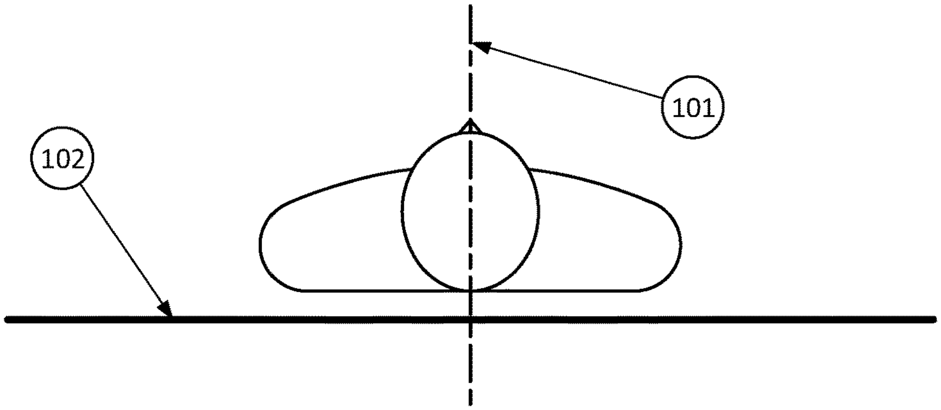
FIG. 1 is a transversal view of a support surface positioned horizontally and having centralizing and laterally extending side mechanisms in accordance with the principles of the invention, the dotted line representing the center axis of the base structure.
Figure 2:
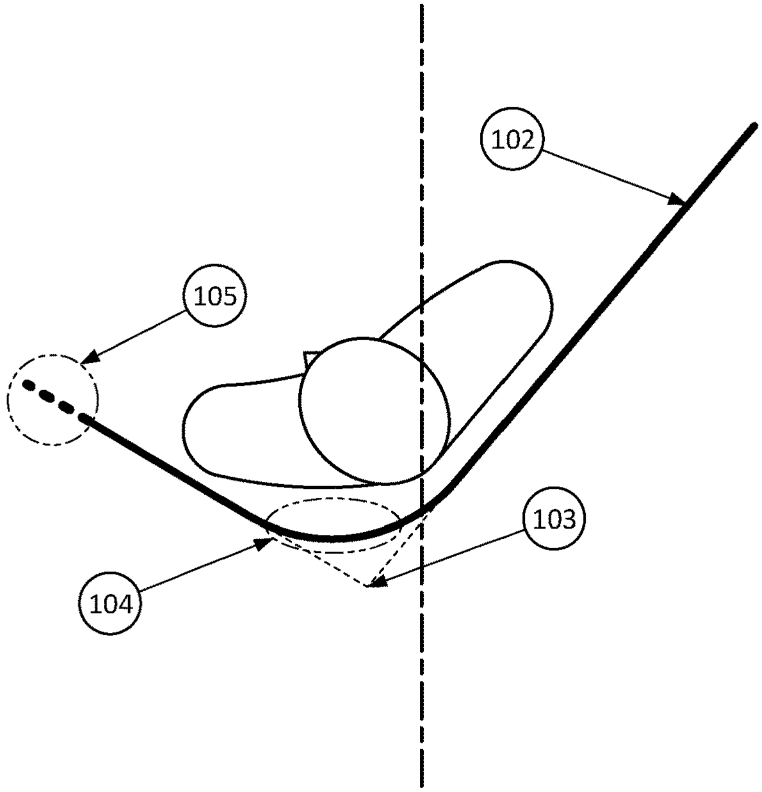
FIG. 2 is a transversal view of the support surface of FIG. 1 with a left side positioning of the surface.
Figure 3:
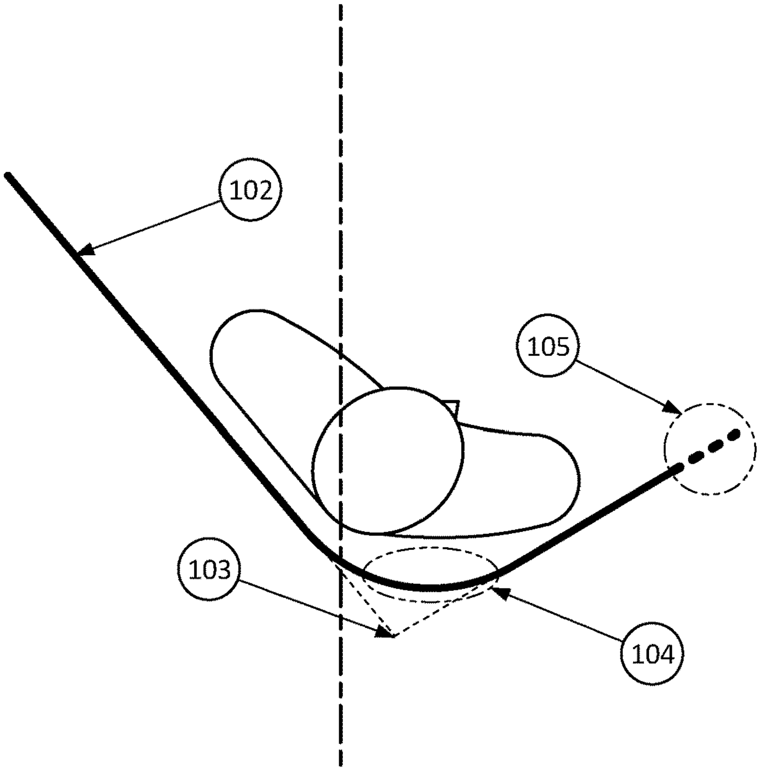
FIG. 3 is a transversal view of the support surface of FIG. 1 with a right side positioning of the surface.

The surface 102 may be shaped as an entirely horizontal surface, as seen in FIG. 1. The surface 102 may be embodied as a curved surface, as seen in FIGS. 2 and 3, in the general transversal direction of the bed. In order to do so, folding lines 103 (or deformation lines) may be found along the longitudinal direction of the bed 102. The lowest zone of the surface 104, also referred to as local minimal zone of depth of the bed, may be located on the left or right side of the median line 101 of the bed 102 (FIGS. 2 and 3). The local minimal zone 104 may be formed on the left or right side of the vertebral column of the patient, where the center of mass of said patient is usually located. With the mechanical inclination of the support base, the center of mass is progressively angled. In other words, it is as if the center of mass of the patient is slightly off centered relative to its support base, but the balance position of its body is close by. Gravity passively and slowly rolls the patient towards its now balance point. In order to rotate a patient on its left side (FIG. 2), the local minimal zone 104 is created on the left side of the patient's center of mass, which makes the patient roll on its left side. Accordingly, pressure points may be displaced elsewhere once a patient has been rotated on the side towards the left local minimal zone. While the patient is rotated, the side of the support surface (FIG. 2 or 3), towards which the patient is turned, is raised to prevent the patient from falling of the bed, by stopping its rolling, further to the usual protection from the sides. In turning (such as rolling on the support surface), to prevent that the head of the patient hits against the sides of the bed, the support surface may be expanded, such as being extended or the sides being moved at a distance. The distancing of the sides of the bed generally prevents the patient to hit said sides as the patient is brought back towards the center of the bed. The extension of the support surface 105 increases the area available for positioning the arms and legs of the patient. The said distancing and extension of the sides generally equivalent to sliding a patient towards the center of the bed as performed by a caretaker.

Figures 4, 5, 6:
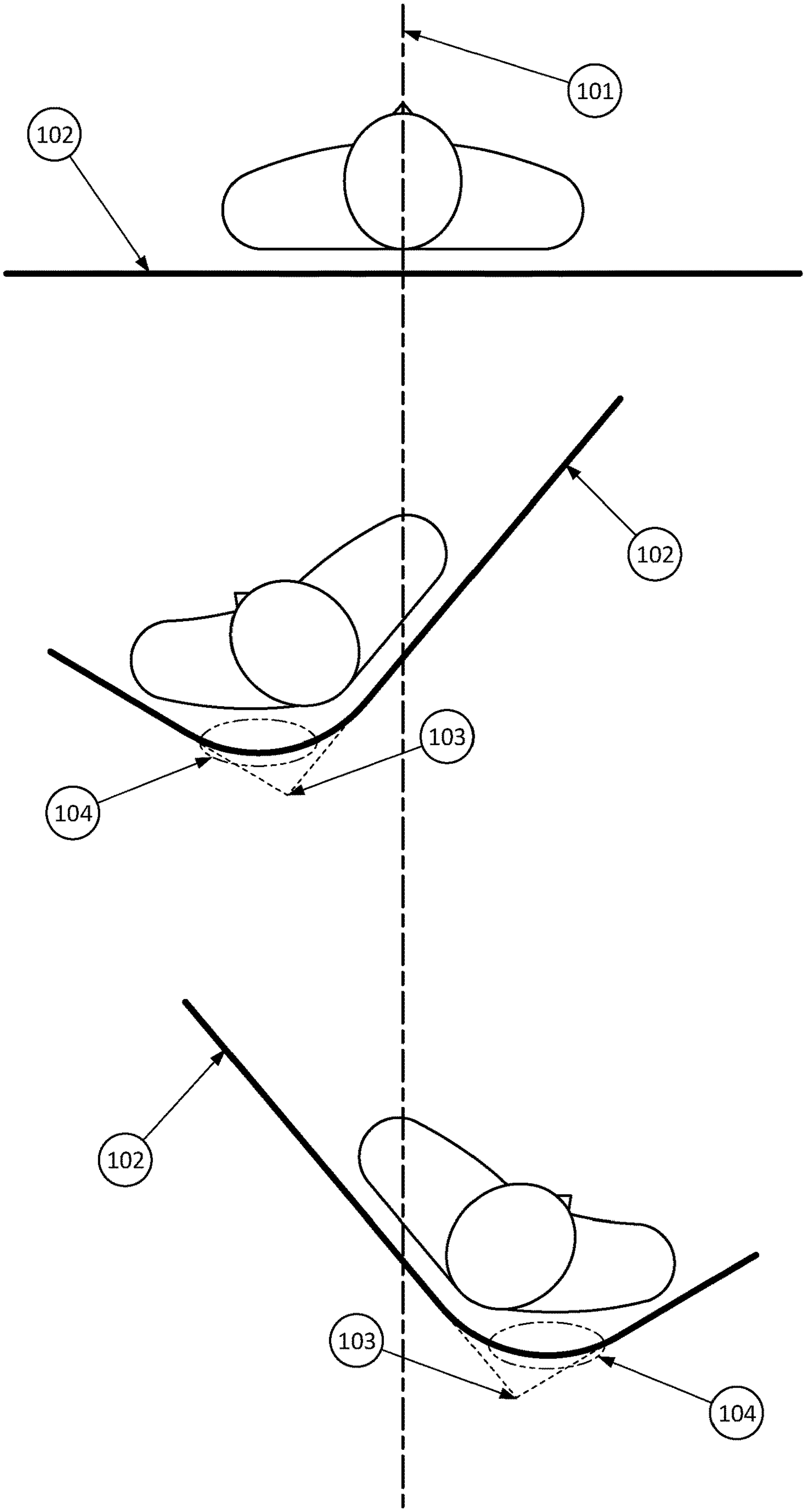
FIG. 4 is a transversal view of a support surface positioned horizontally and without centralizing and laterally extending side mechanisms in accordance with the principles of the invention.
FIG. 5 is a transversal view of the support surface of FIG. 4 with a left side positioning of the surface.
FIG. 6 is a transversal view of the support surface of FIG. 4 with a right side positioning of the surface.

Now referring to FIGS. 4 to 6, an embodiment of the support surface 102 is shown without the mechanisms of centralizing and extending the support surface 102. As shown, once rotated the patient is maintained away from the median line of the bed. As shown, the turn side of the support surface 102 provides less surface to place the arms and legs of said patient.

Figure 8:
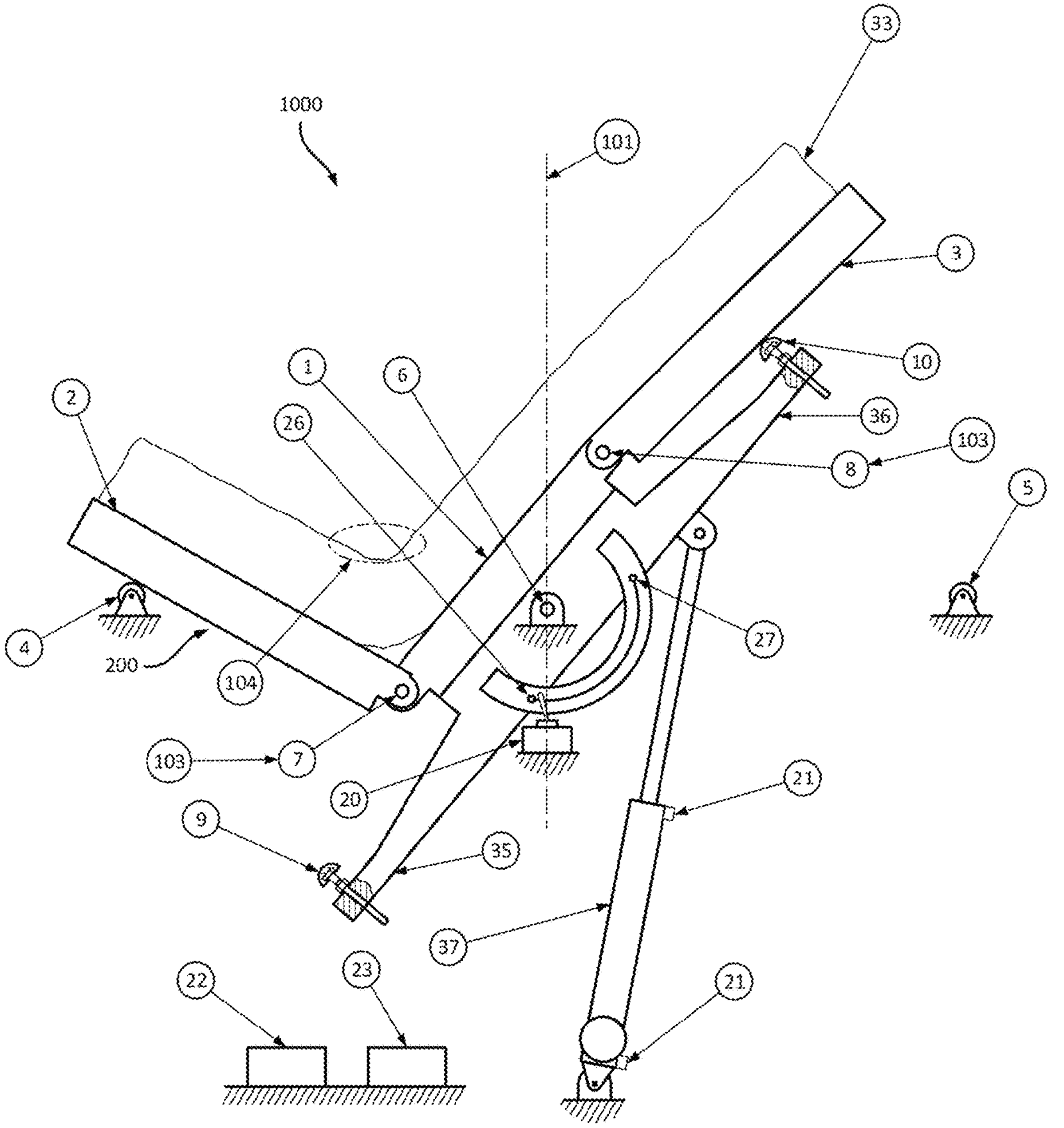
FIG. 8 is a transversal view of a support surface without centralizing and laterally extending side mechanisms with a rotation center located under a main surface in accordance with the principles of the invention.
Figure 10:
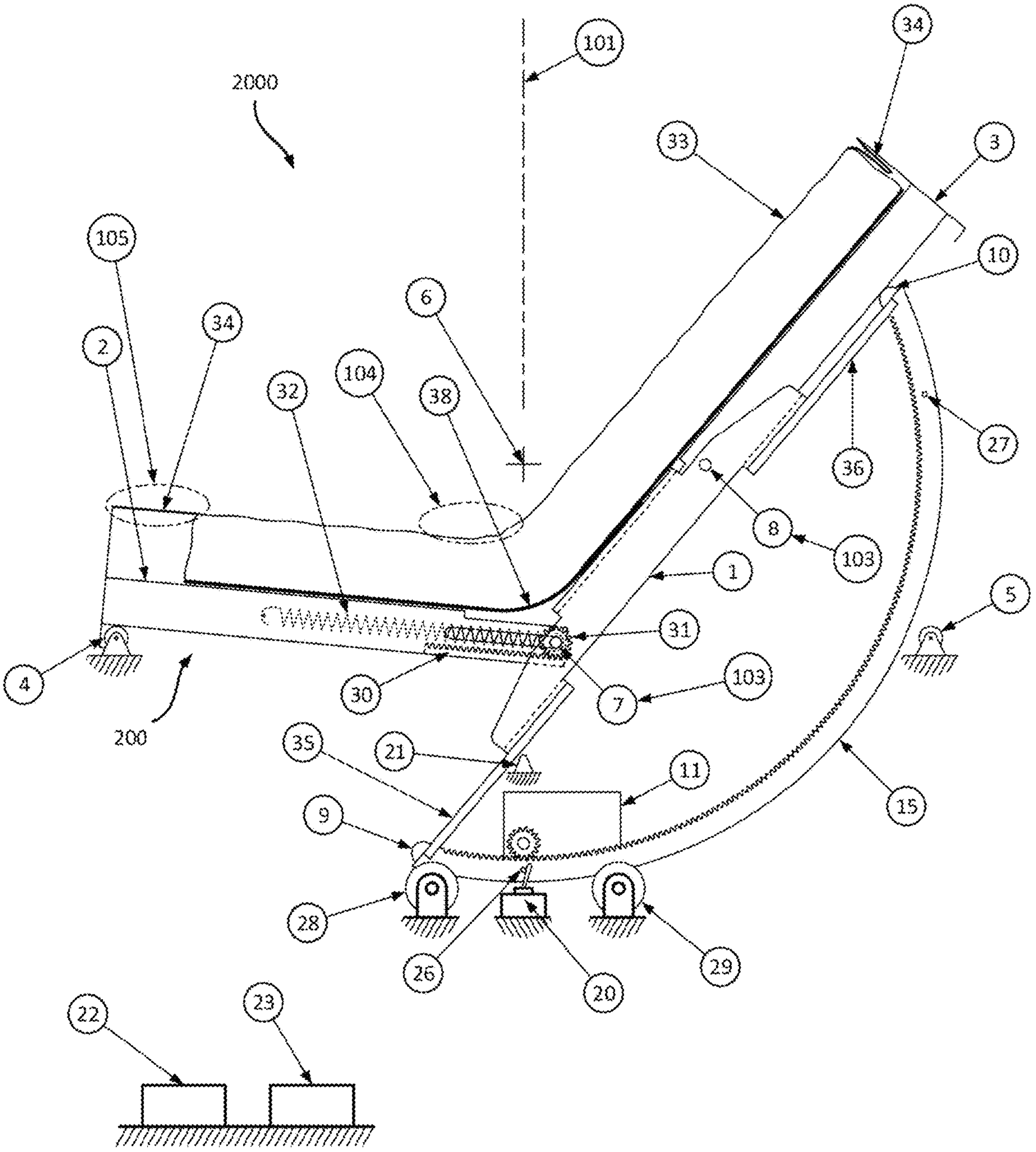
FIG. 10 is a transversal view of a support surface with centralizing and laterally extending side mechanisms with a rotation center located over a main surface in accordance with the principles of the invention and shown.

Typically, the support surface 102 may comprise a minimum of three panels attached to one another. The three panels may be attached using hinges (7 and 8) positioned in the longitudinal direction of the patient (see FIG. 8 for instance). In such embodiment, the three panels comprise a central panel 1 and two lateral panels (2 and 3). Accordingly, the hinges (7 and 8) may act as folding lines 103 of the support surface 102. A mattress 33 may be positioned over the panels (1, 2 and 3). When the panels are folded, the top surface of said mattress may be curved, as seen in FIGS. 8 and 10. The movement of centering the patient and to extend the support surface will be further described starting from FIG. 8.

Figure 7:
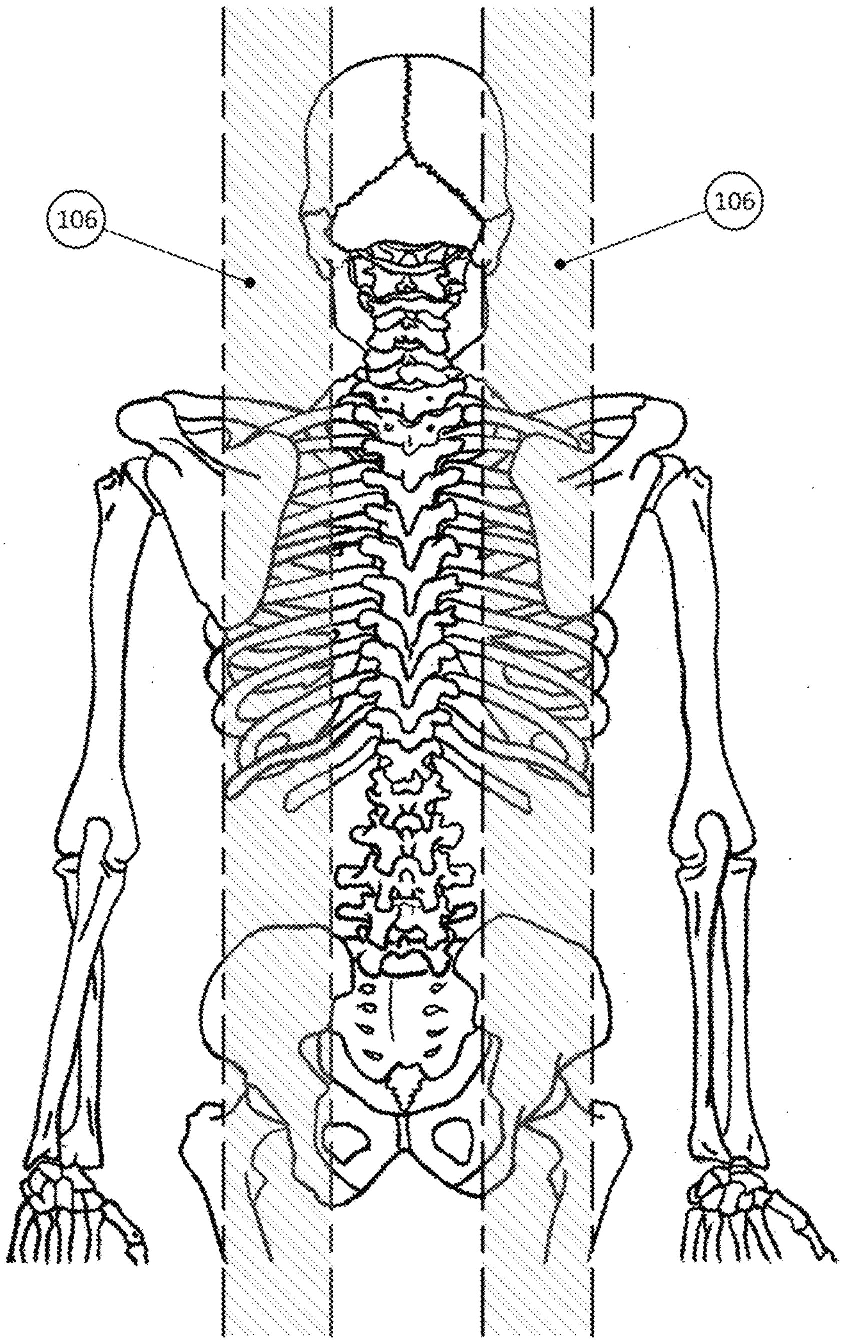
FIG. 7 illustrates optimal folding zones for creating local minimal zone of depth on a support surface to the left and right of a human skeleton in accordance with the principles of the invention.

Now referring to FIG. 7, an embodiment of a method to adjust the width of the central panel 1 based on the anatomy of a patient is shown and explained. With dorsal decubitus, since the back forms a convex surface in view of the spine (or the longitudinal axis), the pressure on the body mostly presses on the shoulder blades of the scapular belt and on the region "sacrum-coccyx" of the belt of the pelvis. For this reason, pressure wounds may develop in such locations. The sacrum and the coccyx, on the back, are generally positioned straight on the bed. The sacrum and coccyx constitute the sustentation basis of the pelvis in decubitus. Such rigid base, in width, is relatively narrow. Taking into account of the thickness of the soft tissues behind the pelvis, the width of this support base 102, relatively rigid, equals approximately one quarter to half of the width of the patient's pelvis, depending on his constitution. For this reason, in a preferred embodiment of the invention, the width of the central panel 1 may be narrow, such as being between a quarter and half of the width of the pelvis of the patient. It may be noted that the mattress 33 is deformed during the inclination of the central panel 1. As the central panel 1 is inclined, the folding zone 106 moves closer to the spine of the patient.

Furthermore, the location of the folding lines 103, shown as hatched zones of FIG. 7, and in order to respect the anatomy of the patient, generally align with respect to the transversal curve of the belt of the shoulder blades and of the pelvis. Regarding the shoulders, the folding line 103 may be located inside the tip of the shoulder blades. The external limit of the hatched zone is the line passing by the tip of the shoulder's blades, for the patient laying on his back. During the unrolling of lateral decubitus, the shoulder blades may slide by themselves on the thoracic cage to adjust with the lateral rotation. In such embodiment, the patient may not be turned more than about 60 degrees, otherwise the weight of the patient pushes against the acromioclavicular extremity of the shoulder and the patient may become sore after a prolonged period. Regarding the pelvis area, the folding line 103 generally passes outside of the sacroiliac joint, but inside the external limit of the hatched zone to benefit of the curve of the buttocks of the patient (in the transversal direction). Such position of the patient generally facilitates passive rolling of the patient (FIG. 7). Thus, lateral decubitus may be very comfortable on the shoulder blades of the patient while sliding on the thoracic cage and on the external muscular mass of the buttocks.

Figure 9:
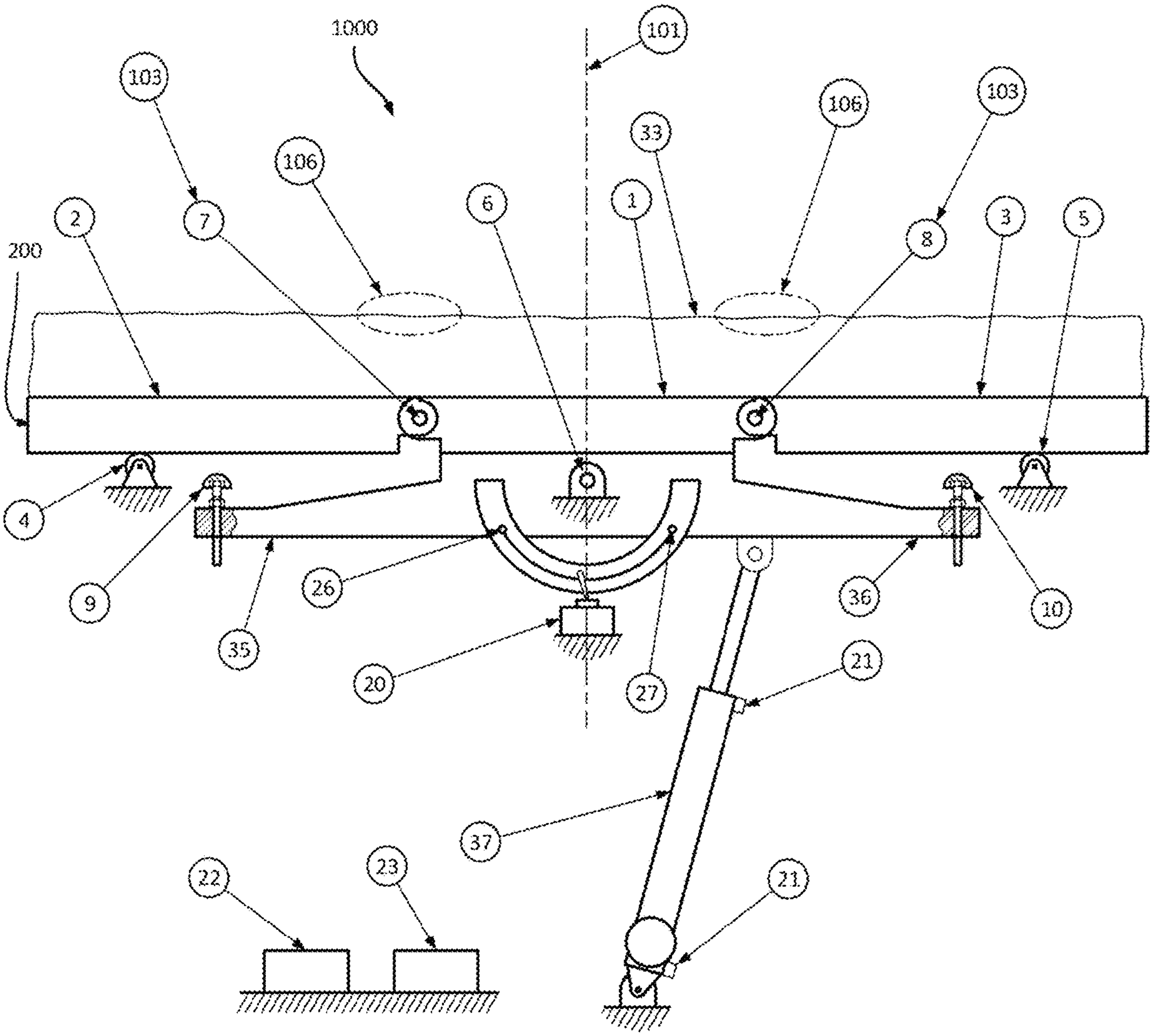
FIG. 9 is a transversal view of the support surface of FIG. 8 in a neutral horizontal position.
Figure 11:
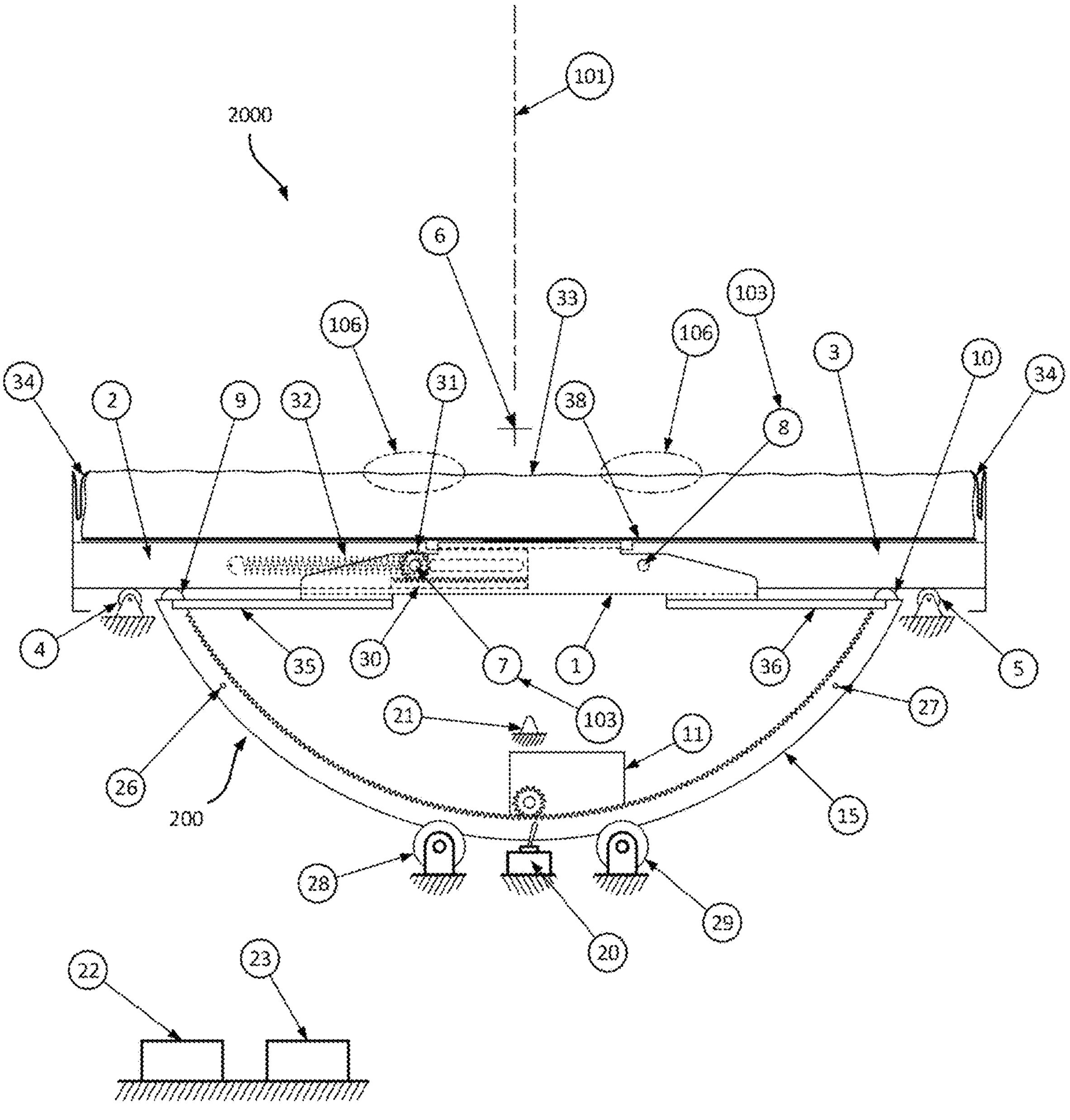
FIG. 11 is a transversal view of the support surface of FIG. 10 in a neutral horizontal position.

Understandably, many embodiments of the device may provide the above-mentioned characteristics and objectives. The embodiment presented in FIGS. 8 and 9 may provide a simple device 1000 without mechanism for centering a patient and without mechanism for extending the support surface. FIG. 8 illustrates the device 1000 being positioned to turn the patient on one side. FIG. 9 illustrates the device 1000 being positioned in a neutral or horizontal position. FIG. 10 illustrates another embodiment of the device 2000 in which the said device is positioned to turn the patient on one side. FIG. 11 illustrates the device 2000 of FIG. 10 positioned in a neutral or horizontal position.

Generally, the device (1000 or 2000) comprises a frame 200 or a structure of the bed, a support surface 102 comprising a central panel 1 pivoting with a flexible membrane 38, lateral panels (2, 3), a mattress 33, a power module 22, a movement control module 23, position switches (20, 21) and a motor 11. The shape of the support surface 102 may be changed using the rotational movement of the pivoting central panel 1. The power module 22 typically provides energy to the movement control module 23, to the position switches (20, 21) and to the motor 11. The power module 22 is generally fed by electrical current, such as AC and/or DC, or by other known power sources.

Referring now to FIGS. 8 and 9, an embodiment of the device 1000 wherein the rotation axis 6 is located at the same level or lower than the central section 1 is illustrated. The device 1000 is simpler mechanically than the device of FIGS. 10 and 11, since it is without mechanism for centering the patient and without a mechanism for extending the side panels. In some embodiments, it may be possible to add a separate mechanism allowing a centering of the patient turned towards the median line of the device, while keeping the rotation axis on the same level or lower than the central panel. In such an embodiment, it is possible to add a separate extension mechanism of the side panels towards which the patient is turned.

FIGS. 10 and 11 show another embodiment of the device 2000. The center of rotation 6 is generally located above of the central section 1 and is represented by a cross. The position of the rotation center 6 of the central section 1 generally allows the lateral displacement of said central section 1. The central section 1 is displaced similarly to a hammock. The displacement of the central panel 1 is similar to a rotation and a translation of a person laying in a hammock. When the rotation center 6 is located above the central panel 1, said central panel 1 may rotate and translate when displaced on a curved rack 15. The curved rack 15 represents the dynamic trajectory of the hammock with its virtual center of rotation located on top. The strategic location of the rotation center 6 is the principle of the mechanism of the invention to turn a patient and to centralise said patient towards the center of the frame 200. The patient, thus turned on the surface of the mattress 33 approaches rack 15 but the translation of the central panel 1 (of the support surface 102 of the bed) distances the patient from said rack 15. The total lateral displacement of the patient towards the rack 15 will thus be less important, null, or may result in a distancing from the side panel (2 or 3) of the turned side. The mechanism turning/centralising the patient typically comprises the curved rack 15, the central panel 1, a motor 11, support wheels (28 and 29) and a frame 200, as shown in the embodiments of FIGS. 10 and 11. By extension, in other embodiments (not illustrated), the curvature of the rack 15 may be circular, elliptical, straight or other. Therefore, the rotation center 6 of the central panel 1 may be fixed or mobile depending on the desired rotation and translation.

Still referring to FIG. 10, the central pivoting surface 1 is displaced on the frame 200 following the arch of the curved racks 15. In such embodiment, the lateral panels (2, 3) extend on both sides of the central surface 1. The side panels (2, 3) may pivot on axis (7, 8). The side panels (2, 3) may further extend laterally by sliding perpendicularly to the axis (7, 8) along the straight racks (30). The extension of the lateral panel (2 or 3) creates the extendable surface 34 of the mattress. The extendable surface 34 is attached to the side of the mattress 33 and to the extremity of the lateral panel (2 or 3). The central surface 1 comprises support arms (35, 36). The lateral panels (2, 3) are supported by adjustable simple supports (9, 10) that are located on the support arms (35, 36). The maximal opening angle between the central surface 1 and the lateral panels 2, 3 may be defined by the adjustable simple supports (9, 10). The central panel 1 is generally motorised by a gear motor 11. Understandably, any other type of motor 11 could be used. The amplitude and the direction of the movement of the central panel 1 are typically controlled with position bumpers (26, 27) and with contact switches (20, 21).

In an embodiment of the invention (FIG. 10), the lateral panel (2 or 3) generally allows three distinct movements. The first movement is a rotation (according to axis 7 or 8) of the lateral panel (2 or 3) relative to the central panel 1 to form with said central panel a concave surface. The second movement generally comprises a lateral panel (2 or 3) being combined with the central panel 1 as one rigid body when elevated in the air, supported by the arms of the central panel (35 or 36). The second movement is performed without contact with the frame 200. The third movement is the extension in width regarding the axis (7 or 8). This movement is assured by a lateral extension mechanism of the support surface 102. The lateral extension mechanism comprises the central panel 1, the lateral panel (2 or 3), the rotation axis (7 or 8) combined with the gears 31 and the springs (32). The central panel 1 comprises holes to house the axis (7 and 8). It further comprises a flexible membrane 38. The membrane 38 prevents shear forces from the lateral panels on the mattress caused by the extension movement of the lateral panels. The membrane 38 further protects the mattress from being stuck between the junctions (7 and 8) of the panels. The lateral panel (2 or 3) comprises a minimum of two straight racks 30 located close to the extremities of the lateral panel (2 or 3). The lateral panel (2 or 3) may also comprise oblong holes over the straight racks 30. The oblong holes may allow the axis (7 or 8) to slide along the racks 30. Such sliding movement generally allows the lateral panel (2 or 3) to extend and to be retracted in view of the axis (7 or 8). The rotation axis (7 or 8) comprises gears 31 pivotally attached to a bar (or tube). The gears 31 are placed facing the straight racks 30. By rolling over the straight racks 30, the gears 31 assures that the lateral panel (2 or 3) slides perpendicularly to the axis (7 or 8) during its movements of extension or contraction. One of the extremities of the tension springs 32 is attached to the lateral panel (2 or 3) and the other extremity of the springs 32 is attached to the rotation axis (7 or 8). The springs 32 thus allow the stability of the movement and of the positioning of the lateral panel (2 or 3). Once the central panel 1 is in motion from the horizontal position, the lateral panel (2 or 3) turns around the central panel 1 while being supported at its external extremity by the roller (4 or 5). During the pivoting movement of the central panel 1, the lateral panel (2 or 3) extends under the membrane 38 when its side flange touches the roller (4 or 5). The movement of contraction of the lateral panels (2 or 3) is the inverse of the extension movement.

In an embodiment of the invention, as shown in FIGS. 10 and 11, the frame 200 is embodied as the rigid structure that supports the central panel 1 with the curved racks 15. The frame 200 acts as an anchor point to the gear motor 11. The rollers (4, 5) are attached to the frame 200 and support the lateral panels (2, 3). All the control components are installed on the medical bed in order to be accessible to the patient and to the care givers.

The panels (1, 2, 3) of the device (1000, 2000) may have a length similar to the length of the bed. The panels (1, 2, 3) may also comprise separate sections. Each section may be raised to raise the chest and the legs of the patient, similarly to standard hospital beds.

The device (1000, 2000) may also comprise a plurality of sections in the transversal direction (three or more) having adjustable distances between the median line and the local minimal zones of depth. Such sections generally provide improved comfort and improved efficacy of the rotation of the patient based on the width of the shoulders, the pelvis and the body of the patient. The transversal sections may have flexible surfaces or may be composed by multiple smaller independent surfaces.

The mattress 33 is generally flexible to conform to the concave form of the support surface 102 of variable geometry. The mattress 33 may also be extendable/collapsible to follow the lateral extension/collapsing of the lateral panel.

In an embodiment, the control of the movements of the device in time are important to prevent wounds to the patient. The movements in time of the support surface 102 may be programmed by a timer. There may, for example, be three types of programs with the support surface 102: intermittent movement (progressive), complete periodic movement or direct control of the movements.

The intermittent movement functions in automatic mode. The intermittent movement functions provide a cyclical trajectory pivoting left-right and right-left, in small steps (progressive), with a programmable duration of each demi-cycles (left-right or right-left), which assures that no surface of the skin of the patient undergoes high pressure from the weight of his body for more than two hours. To alleviate the writing, the term left-right will be used to describe the pivoting movements from left to right and/or the inverse movement of the device.

The periodic movement works in automatic mode. It represents a complete movement of change of the position left-right (a half-cycle) in a small period of time. The periodic movement is engaged by a pre-adjusted timer which activate the rotation at predetermined times, such as every two hours or less.

Finally, the direct control allows to replace the support surface 102 in neutral horizontal position, to pivot the device (to the left or right) and to stop the movement at a desired position.

The control may also comprise the following typical functions of the movement of the support surface 102:

The choices of the movement type (manual or automatic or semi-automatic);

The function to start up or stop the automatic cycles;

The direct function to turn the patient to the right and to stop in a desired position;

The direct function to turn the patient to the left and to stop in a desired position;

Furthermore, the control may comprise the following advanced functions:

The programing of the automatic cycles' duration (may be reprogrammed);

The programing of the inclination angle's amplitude (may be pre-adjusted);

The manual adjustment of the pivoting speed of the device;

The direct function to replace the support surface in the horizontal position.

In some embodiments, the device may further comprise a rechargeable or renewable power source to assure the mobility and the autonomy of the device during its displacement from one location to another. The device may also comprise a manual mode or mechanism for troubleshooting any issues.

Generally, the system for controlling movement of the device may comprise one or more of the followings: electrics, electronics, software, hydraulic, mechanic modules or subsystems. The following description of a control system (FIG. 12) is an embodiment that explains the role of each of the components of FIG. 12 and the typical functioning of the system.

The system for controlling movement of the device (FIG. 12) typically comprises a power module 22, a movement control module 23, position switches (20, 21), and a locomotion means 11.

The gears motor 11 is typically powered or fed with continuous current. The speed and rotational direction of the gear motor 11 may be changed by varying the DC tension, such variation being typically provided by the speed controller 12.

In some embodiments, the speed controller 12 is a DC tension dimmer adapted to inverse the polarity of the outputted DC current. The inversing of the polarity may be controlled using a switch 20 having two or more states.

Typically, the timer 14 may be configured to control the stopping and the start times of the gears motor 11. The timer 14 may be adjusted to provide fixed durations of the cycles of opening and closing of the DC current supply contact.

The switch 17 may have two positions "ON-ON". The switch 17 may select an automatic or a manual mode.

In some embodiments, the command console comprises a switch having two positions "ON-OFF" 18 swapping the start and stopping of the automatic cycles by controlling the DC current provided by the timer 14.

Typically, the double momentary switch (normally opened) comprises three positions "ON-OFF-ON" 19. The double momentary switch generally acts as a direct manual control to move the support surface 102 to a desired position.

Typically, the double momentary switch 21 having two positions 20 is used to change the direction of the gears motor 11 by inversing the polarity of the speed controller 12 in automatic modes of the double momentary switch may further control the stopping circuit of the gears motor 11 in automatic-periodic mode.

Typically, the two position switches 21 (usually closed) are used as position sensors to limit the amplitude of the movement of the left-right pivoting in manual mode.

In some embodiments, the power module 22 generally comprises an AC-DC converter 13 adapted to transform the 110/120V AC current in a continuous DC current and a rechargeable battery 16.

In some embodiments, the command console comprises a switch having two positions "ON-OFF" 24 activating the stopping circuit of the gears motor 11 in automatic-periodic mode.

Typically, the stopping circuit of the gears motor 11 for automatic-periodic mode typically comprises the two switches 25 of relay type and the two switches (20 and 24).

Figure 12:
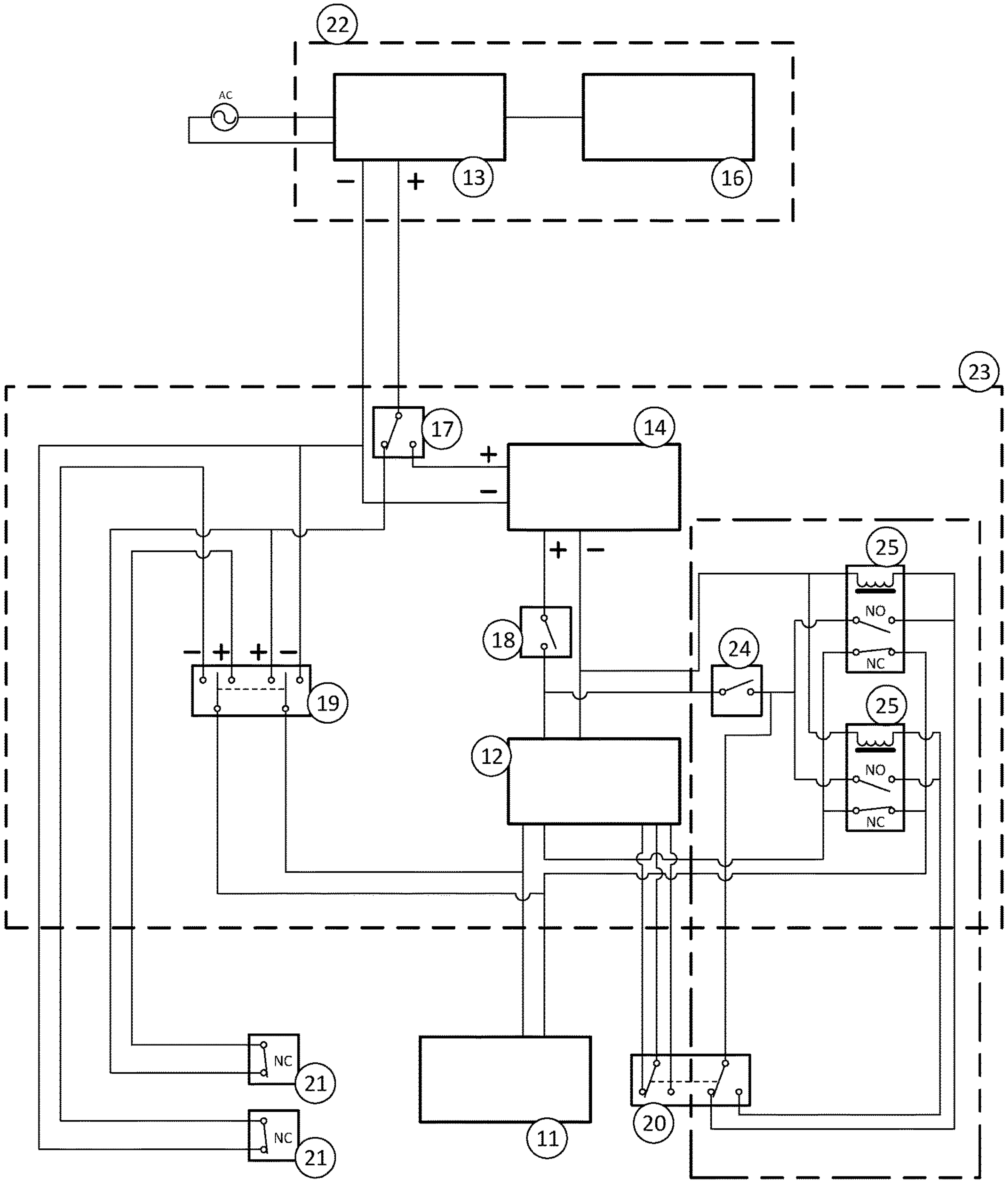
FIG. 12 is an illustration of an electrical diagram for controlling movements of a support surface in accordance with the principles of the invention.

Referring to FIG. 12, the module 23 controlling the movement typically comprises the automatic and manual selectors 17, the timer 14, the on-off switch 18, the periodic mode switch 24, the two relays 25, the speed control 12 and the momentary switch 19. The module controlling the movement 23 generally acts as a command console for the user.

An example of how an embodiment of the control system (FIG. 12) works is described in the following paragraphs:

In this embodiment, the power module 22 powers the control module 23. The power module 22 is linked to the position switches (20 and 21) in order to activate the movement of the gears motor 11.

The AC-DC converter 13 is typically powered by an AC current, and the converter 13 provides the DC current to the control module 23. In some embodiments, the converter 13 may be connected to the rechargeable battery 16 to simultaneously charge the said rechargeable battery 16. When the AC-DC converter 13 is not powered by an AC source, the power source is switched to the battery 16, thus replacing the AC-DC converter 13 as the power source.

Typically, the automatic and manual modes selector 17 may direct the DC alimentation toward the programmable timer 14 or toward the manual momentary switch 19. When the timer 14 is powered in automatic mode, the timer 14 may control the duration of the closing and the opening of the contact. It allows to provide or cut the power to the speed controller 12. The amplitude of the movement of the support surface is limited by the positions of the bumpers (26, 27 of FIG. 10). The bumpers 26, 27 are generally positioned to be pushed against the switch 20 to activate the said switch 20. The speed of the movement is modulated by the speed controller 12.

In some embodiments, the speed controller 12 is may be configured to control the closing or the opening of the timer's contact 14. In these embodiments, the automatic-intermittent movement of the device is activated.

In some embodiments using an automatic-periodic mode, the DC current of the timer 14 feeds the switch 24. The switch 24 is connected and feeds the current to the two relays 25. Based on the state of the switch 20, one of the relays 25 may be auto-powered. The relay cuts the current of one of the two paths going to the gear motor 11 when powered by the switch 20. At the end of the demi-cycle, the switch 20 changes state and the second relay 25 cuts current to the second/last path. As the current is cut, the movement of the device is stopped. The two relays 25 then return to their initial state when the timer 14 does not provide current until the next demi-cycle.

In other embodiments, an additional switch 18 may control the current between the timer 14 and the speed controller 12. This switch 18 controls the automatic movement of the device to be turned on or off.

In some embodiments using a manual mode, the switch 17 controls the DC current towards the double momentary switch 19. At the same time, the switch 17 cuts the current powering the timer 14. The gear motor 11 is thus advanced or backed with the switch 19. The two switches 21 cut the DC current of the gears motor 11 when it reaches permissible limits of the amplitude.

Other Utilities of the Invention

A therapeutic bed typically includes standard functions to the treatment imperatives, to the imperatives of facilitating the nursing cares and to the imperatives of the comfort of the sick. As an illustration, the backrest lifting may improve the pulmonary ventilation in case of acute edema of the lungs, in case of respiratory insufficiency; the backrest lifting may also facilitate the taking of meals in bed; finally, the backrest lifting may further improve the comfort of the patient during reading, during conversations. The knee-rest lifting may ease the swelling of the legs in case of venous insufficiency and in case of phlebitis; it may facilitate the wearing of compression socks for patient by caretakers; it may improve the comfort of the patient.

The backrest lifting and the knee-rest lifting are mostly standard functions already integrated in every hospital beds nowadays. The functions of turning/centering the bedridden according to the present invention further fulfills the three above-mentioned imperatives.

In addition to the reduction of pressure wounds, the capacity of turning the patient with the device may contribute to the healing of a bed wound already present from a conventional standard bed. According to the parameters set by the caregivers, the device continues to turn the bedridden person but never stops on the wound, thus allowing the wound to heal.

Further to prevent pressure wounds, the current device may further limit the pain felt by the bedridden patient caused by pressure. Such pain is a throbbing pain which may start well before the apparition of wounds. The pain relief is another clear medical indication.

The current device may be used with patients having difficulty in changing position in a bed. For example, patients in surgery that have difficulty mobilizing in a bed after an operation to the head, the spine, the thorax, the abdomen, the pelvis, the upper or lower members, may be included. A good portion of these patients may already have had this difficulty before surgical intervention, because of traumas, fractures, malformations, infections, inflammation, cancer, etc. Patients from other non-surgical specialties are not excluded either: neurological patients affected by neuromuscular conditions, by multiple sclerosis, cerebrovascular accidents; the elderly patients with cognitive troubles; the patients suffering from respiratory insufficiency problems plugged to oxygen; the patients under intensive care; the patients with consciousness alterations; the patients with chronical inflammatory rheumatoid arthritis or in acute flare-ups; the patients cachectic palliative care . . . . The above list is not exhaustive. By its medical, pre-emptive and therapeutic indications, the device by turning/centering a bedridden patient may become a new standard function of medical bed, for a really large number of hospitalized people.

Furthermore, the capacity of turning and centering a bedridden patient by the device may reduce the physical effort required by the patient attendants. It may also help reducing the number of patient attendants required each two hours to carry out the task. Without this device, two to four caregivers are required to turn/center a patient. For example, the presence of one patient attendant is necessary to supervise the process now mechanised. Furthermore, to take care of the hygiene of the sick, to dress them, to transfer them from a bed to a chair, etc., the caregivers periodically turn the person from one side to another. Again, this mechanised task may help reduce the physical effort and the risks of injury of the caregivers. Thus, this device answers to the imperatives of facilitating the care given by the healthcare practitioners.

Further, the comfort of the patient having difficulty turning in a bed may be increased. By the simple pressure on the bed functionality command device, the patient may do it himself, as often as he/she wishes, without the need of calling and waiting on caregivers, already overloaded.

Thus, the new device, integrated in the functions of a medical bed, may become a new standard of hospital beds.

Further on, here are some security notions in regard to the use of the device. The device represents a moving mechanism involving a transforming geometry. No mechanism may assure a perfect security without visual monitoring from caregivers. It is thus imperative to have an adequate surveillance in order to prevent the patient from being stuck in uncomfortable or dangerous positions. To do so, the device may be paired with a camera system for the surveillance at a distance, or routine visits may be done.

It is important to note that the device helps turn the body of a patient, but the device does not aim at positioning the limbs. After the patient is turned, the presence of a caregiver is generally required to place the head, the arms and the legs of the patient in a comfortable position, especially if the elevation angle is high.

While illustrative and presently preferred embodiment(s) of the invention have been described in detail hereinabove, it is to be understood that the inventive concepts may be otherwise variously embodied and employed and that the appended claims are intended to be construed to include such variations except insofar as limited by the prior art.

The invention claimed is:

1. A variable geometry device for turning and centralizing a patient, the device comprising:

a frame;

a longitudinal central panel, the longitudinal central panel being rotatable around a rotation point and translatable along a predetermined path;

two longitudinal side panels, the central and the two side panels being attached to the frame and forming a variable geometry surface, the central and a first of the side longitudinal panels being movable to vary the shape of the variable geometry surface into a concave surface, the concave surface comprising a lowermost zone being adapted to be under and between the spine and an end of the width of the patient;

a rotational assembly comprising a curved gear attached to the longitudinal central panel, the curved gear being supported by supporting wheels and being actuated by a movement control system, the shape of the curved gear defining trajectory of the longitudinal central panel.

2. The device of claim 1, the variable geometry surface being repositionable at a horizontal stable equilibrium position.

3. The device of claim 1, the device further comprising a mattress on the variable geometry surface, the mattress having an adaptable width to adapt to the variation of the side panel on which the patient is turned.

4. A method for turning and centering a patient, the method comprising:

moving a central panel of a bed frame along a trajectory defined by a shape of a rotational assembly;

transforming an initial horizontal support surface of the central panel and at least one longitudinal side panel into a concave surface, the concave surface comprising a lowermost zone located under and between the spine and an end of the width of the patient;

upon moving the longitudinal panels, turning the patient to a side in the lowermost zone of the formed concave surface under the effect of gravity;

re-centering the patient toward a medial line of the frame; and increasing the width of the support surface on the side that the patient is turned.

5. The method of claim 4 further comprising moving the central panel and the longitudinal side panel to move the patient towards the median line of a frame supporting the supporting surface during the turning of the patient.

* * * * *